United States Patent
Karavadi et al.

(10) Patent No.: US 10,373,320 B2
(45) Date of Patent: Aug. 6, 2019

(54) METHOD FOR DETECTING MOVING OBJECTS IN A VIDEO HAVING NON-STATIONARY BACKGROUND

(71) Applicant: Uurmi Systems Pvt Ltd, Telangana (IN)

(72) Inventors: Adithya Apuroop Karavadi, Telangana (IN); Ajinkya Santoshrao Deshmukh, Telangana (IN); Shanti Swarup Medasani, Telangana (IN)

(73) Assignee: Uurmi Systems PVT, LTD, Hyderabad (IN)

( * ) Notice: Subject to any disclaimer, the term of this patent is extended or adjusted under 35 U.S.C. 154(b) by 0 days.

(21) Appl. No.: 15/462,530

(22) Filed: Mar. 17, 2017

(65) Prior Publication Data

US 2018/0268556 A1 Sep. 20, 2018

(51) Int. Cl.
*G06T 7/00* (2017.01)
*G06T 7/246* (2017.01)
*G06T 7/277* (2017.01)

(52) U.S. Cl.
CPC .............. *G06T 7/246* (2017.01); *G06T 7/277* (2017.01); *G06T 2207/10016* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 7,620,266 B2 * | 11/2009 | Brown | ............... | G06K 9/00597 345/640 |
| 8,243,987 B2 * | 8/2012 | Hampapur | ............... | G06K 9/38 382/103 |
| 8,457,401 B2 * | 6/2013 | Lipton | ............... | G06K 9/38 382/173 |
| 8,630,455 B2 * | 1/2014 | Ran | ............... | G06K 9/00778 348/143 |
| 2010/0208986 A1 * | 8/2010 | Cobb | ............... | G06K 9/00771 382/165 |
| 2014/0072170 A1 * | 3/2014 | Zhang | ............... | G06K 9/00369 382/103 |
| 2016/0155024 A1 * | 6/2016 | Partis | ............... | G06T 7/11 382/173 |
| 2016/0189388 A1 * | 6/2016 | Gupta | ............... | G06T 7/11 382/180 |

OTHER PUBLICATIONS

Moving Object Detection, Tracking and Classification for Smart Video Surveillance. Dedeoglu. Aug. 2004.*
Dedeoğlu, "Moving Object Detection, Tracking and Classification for Smart Video Surveillance" dated Aug. 2004, 100 Pages.

* cited by examiner

*Primary Examiner* — Delomia L Gilliard
(74) *Attorney, Agent, or Firm* — Benjamin Balser; Next ip Law Group

(57) ABSTRACT

Method and system for tracking moving objects in a video with non-stationary background is provided. The method comprises estimation of non-stationary background and determining an approximate foreground for each image that learns the background model over time by incorporating various constraints on image pixels. Then, weights based upon spatio-temporal statistical properties of the extracted foreground blobs and blob edge overlap are used to identify and track with bounding boxes displayed for one or more true objects.

15 Claims, 4 Drawing Sheets

METHOD FOR DETECTING MOVING OBJECTS IN A VIDEO HAVING NON-STATIONARY BACKGROUND

FIELD OF THE DISCLOSURE

The present disclosure relates generally to object tracking in a video, and more particularly, to a method for tracking moving objects over a dynamic background.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Recent advancements in the field of image processing and computer vision have led to development of various techniques for tracking moving objects in a scene. A sizeable number of algorithms are based on foreground extraction techniques to extract foreground from a scene that comprises a foreground and a background. Direct foreground extraction techniques such as frame differencing, mean/median filter differencing, Gaussian mixture model based foreground extraction etc. are susceptible to errors due to the dynamicity in the background of the scene. For example, atmospheric turbulence distortions may lead to false classification of object in the image. Algorithms such as Sub-SENSE, ViBe, and Pixel based Adaptive Segmenter (PBAS) are based on background estimation techniques. Though such techniques are better than foreground estimation techniques, the background estimation techniques are also susceptible to distortions like atmospheric turbulence and dynamicity in the image background and particularly fail to reliably detect faint and small moving objects. Moreover, the background estimation techniques are computationally expensive which makes them unsuitable for real time implementation.

The existing techniques for detection of moving objects are generally based on preservation of moving object of the scene along with elimination of distortions caused due to a variety of reasons such as dynamically varying background. One such technique comprises computation of a reference background image by use of a variation median filter. A displacement map of the individual frames of the reference background image may be created and segmented based on sparse optical flow. In such a technique, though the moving objects are preserved, residual turbulent motion is not completely eliminated. Further, it has been experimentally determined that techniques based on optical flow are unreliable in case of turbulence in the scene. Additionally, the aforementioned technique is computationally expensive in scenario when the moving object occupies a significant portion of the scene. Certain other techniques have also been developed that are based on a variant of robust principal component analysis. Such techniques are focused on recovery of a stable background of the scene along with moving objects present in the scene. Such techniques comprise weighting based on optical flow for separation of moving objects from the turbulence present in the scene. Consequently, the moving objects are reliably tracked when the levels of turbulence in the scene is decreased by frame averaging. However, in scenarios where the motion of the moving object is fast, such technique proves to be computationally expensive due to high memory requirements. Further, such a technique fails to reliably track the moving object due to excessive dependence on the optical flow.

In light of the aforementioned drawbacks associated with the existing techniques, there exists a need for a method that robustly tracks the moving object while eliminating distortions. It is also desired that such a technique is not affected by the change in the properties of the potential moving object that are to be tracked. Further, it is desirable that implementation of such a technique is computationally efficient in real time tracking of moving objects.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method and system for detecting one or more moving objects in a video is provided. The video comprises a plurality of images wherein each image has a foreground and a background. The method comprises of determining an approximate foreground for each image; extracting all the foreground blobs having size greater than a predefined threshold; assigning statistical weights for size/area of the extracted foreground blobs, intensity, distance, displacement vectors, and dilated edges measures across frames for the extracted one or more blobs and searching for correspondences for the one or more blobs in the current frame by calculating a final weight as a combination of an initial weight (also referred as dilated edge overlap weight) and a similarity weight (also referred as correspondence weight) with a pre-determined learning rate; identifying potential targets by assigning a weight to the map from one or more blobs in the current frame to the one or more potential correspondences in the next frame, wherein identifying includes selecting the blob with the highest total positive weight as the blob corresponding to the one or more blobs in the current frame; and tracking potential targets and displaying the bounding box for one or more true objects, by selecting one or more potential blobs whose weights of the mapping exceeds a predetermined threshold for more than predefined minimum frames continuously. The approximate foreground for each image of the plurality of images is determined by determining background segment of each image and determining image segment of each image and computing an element by element product, the background segment is determined based on $$S_B(i,j) = \begin{cases} 1, \text{ if } |H_B^{ij}(b(x))| < a_1 + \epsilon h_B^{ij} \\ 0, \text{ else} \end{cases}$$

where $H_B^{ij}(b(x))$ denotes the bins corresponding to the background intensity at location (i,j), $h_B = \max_k H_B(k)$ denotes the values of maximum number of occurrences of a bin, and $\epsilon h_B^{ij}$ is a parameter added to account for noise and compression artefacts. Predefined parameter $a_1$ samples in the background model are relabelled as background. For example, the value of the predefined parameter $a_1$ may be set to 2 samples. The image segment is determined based on $$S_I(i,j) = \begin{cases} 1, & \text{if } |H_I^{ij}(b(x))| < c(i,j)h_I^{ij} \\ 0, & \text{else} \end{cases}$$

where $H_I^{ij}(b(x))$ denotes the bins corresponding to the original pixel intensity at location (i,j), $h_f=\max_k H_f(k)$ and denotes the values of maximum number of occurrences of a bin and $c=0.5(1-2\sigma)$ is the pixel level threshold with $\sigma$ being the standard deviation in the background; refining the foreground of each of the plurality of images by setting pixels in the foreground image of each of the plurality of images to zero if the corresponding foreground sample differs from mean background by less than $\mu+\sigma$ where $\mu$ is the minimum intensity difference for two pixels to be considered dissimilar; relabeling the foreground samples as background that intersect with more than $a_1$ samples in the background model; and updating the most recent background frame B as $B=B\odot S+I\odot(1-S)$ using the segmentation decision where S is foreground and I is image.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The disclosed method detects moving objects independent of size and velocity. The video to be analyzed may comprise images having a dynamic movement in the background. In an aspect, the dynamic movement may comprise one or more of snow, trees waving, rain, Atmospheric Turbulence, and the like. The method has modest memory requirements and the described method can be easily ported on to embedded devices.

Figure 1:
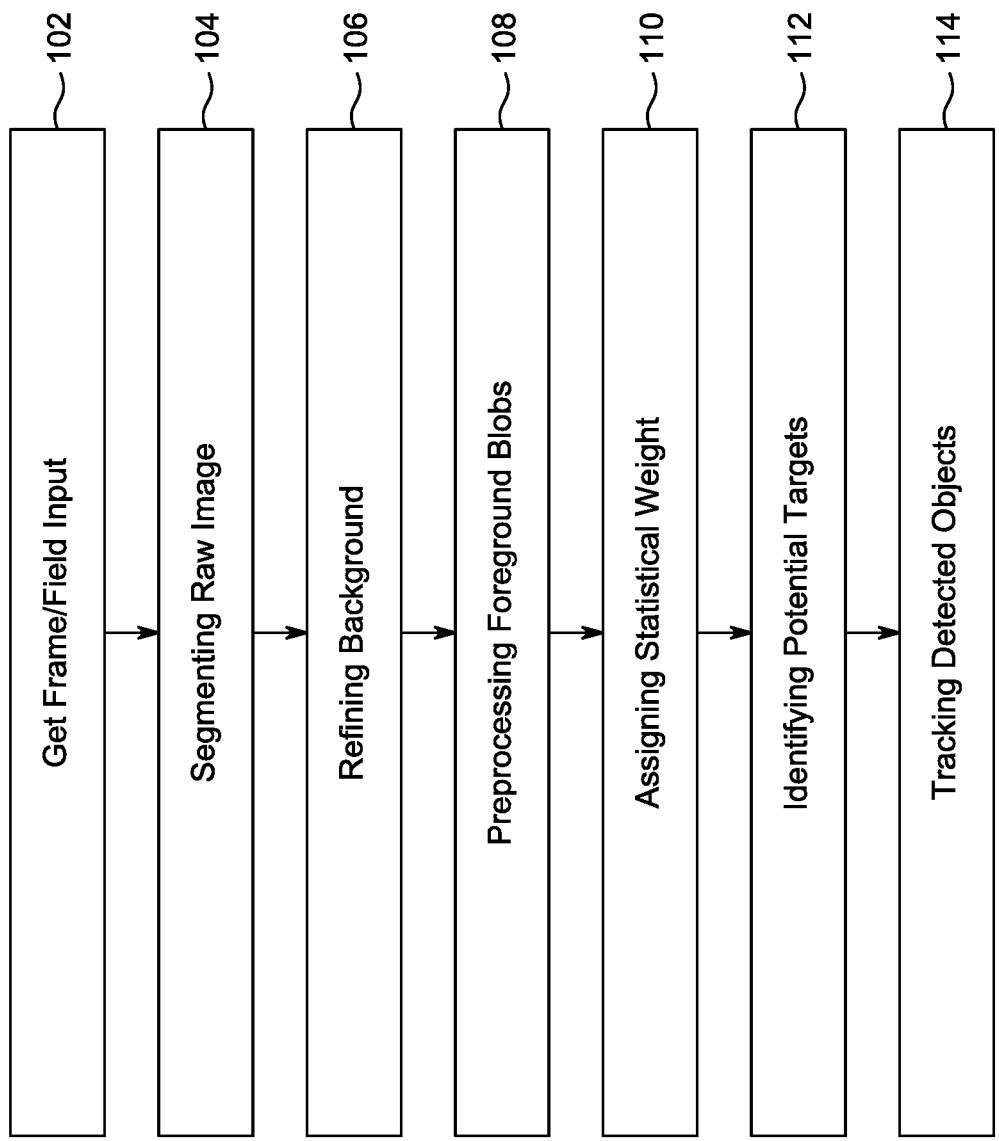
FIG. 1 illustrates a flow diagram of a method for robust tracking of an object, according to an example embodiment.

Referring to FIG. 1 that illustrates a flow diagram of a method for robust tracking of an object. At step 102, the video stream is received the corresponding one or more images are retrieved. In an aspect, one or more even and one or more corresponding odd fields may be retrieved from the video streams. The following method steps may either be carried out on the images or the even and odd fields of the video stream. In the following description the term "image" has been used that needs to be construed as either a frame or even or odd fields. A current frame is the most recent frame which has been completely processed and a next frame is the most recent frame that needs to be processed. Each image contains a foreground and a background. The images may capture movement of one or more objects that may move in the foreground or in the background.

The present method computes the histogram of the pixel values in a temporal window. The histogram is computed for the image and the background. In an aspect, the histograms are computed with a predetermined number of equally spaced bins. For example, a histogram of the image may contain 50 equally spaced bins and similarly the histogram of the background may contain 50 equally spaced bins. Maintaining two separate histograms facilitates in recovering from situations where background objects (S(i,j)=0, where S is the segmentation mask) starts moving and foreground objects (S(i,j)=1) evolve into the background.

At step 104, each of the plurality of images is segmented by determining background segment of each image and determining image segment of each image. Each image contains a plurality of pixels such that each pixel may be denoted by x(i,j). Whenever a pixel x(i,j) is segmented as a background, a random frame is picked from the background model and the background value at (i,j) is replaced by the current pixel value. Thereafter, a randomly chosen neighbour of (i,j) is also updated with the current background value, but only for the initial W frames. This is because updating a random neighbour of (i,j) has the undesired effect of eating away slowly moving objects from its boundaries. However, this step is useful in the initial frames and enables quick learning of the background. Let I be the current M×N image being analyzed and B be the most recent background. Let b: I→ℕ be a mapping from pixel intensities in the range [0,1] to their corresponding bin numbers in the histogram. Let $H_I^{ij}(b(x))$ and $H_B^{ij}(b(x))$ denote the bins corresponding to the original pixel intensity and background intensity at location (i,j) respectively.

$$h_I = \max_K h_i(K) \text{ and } h_B = \max_k H_B(k)$$

denote values of maximum number of occurrences of a bin. The background segment is determined based on equation 1, $$S_B(i, j) = \begin{cases} 1, \text{ if } |H_B^{ij}(b(x))| < a_1 + \epsilon h_B \\ 0, \text{ else} \end{cases} \quad \text{eq. 1}$$

where predefined parameter $a_1$ samples in the background model are relabelled as background. For example, the value of the predefined parameter $a_1$ may be set to 2 samples. $\epsilon h_B$ is a parameter added to account for noise and compression artefacts. In an aspect, a constant value of $\epsilon=0.1$ generally works well for all scenarios.

The image segment is determined based on equation 2, $$S_I(i, j) = \begin{cases} 1, \text{ if } |H_I^{ij}(b(x))| < c(i, j) h_I^{ij} \\ 0, \text{ else} \end{cases} \quad \text{eq. 2}$$

where $H_I^{ij}(b(x))$ denotes the bins corresponding to the original pixel intensity at location (i,j), $h_I = \max_k H_I(k)$ and denotes the values of maximum number of occurrences of a bin and c is the pixel level threshold based on background variance. Since $h_I$, $h_B$ are only the maximum values in the bins, multimodal distributions in the input images are easily taken care of by the present model.

Variance (standard deviation σ) in the detected background is an indicator of background dynamics at the pixel level. In areas of the background where the pixel variance is very low, it is easier to identify faint objects. Conversely, small intensity changes are unlikely to indicate a true object in areas where the pixel variance is high. Therefore, variance is used to set the pixel level threshold c. However, a pixel can still be classified as an object if its intensity is different from the intensities in the pixel history. Taking these into account, the factor c is modelled according to equation 3, $$c=0.5(1-2\sigma) \quad \text{eq.3}$$

where σ is the standard deviation in the background. In an aspect, the value for c is chosen in such a way that if a pixel occurs more than half times the mode at that particular location, then the pixel should be considered background. In dynamic regions, this threshold may be lesser. Further, this threshold may be zero in regions where σ=0.5 (indicating frequent flips in intensity between 0 and 1).

An element by element product $(S_I \odot S_B)$ of the background segment and the image segment is computed for determining the segment (S) of the image. In case, the value of segment S is determined to be '0' then S corresponds to a non-foreground pixel or background pixel and in case the value of segment S is determined to be '1' then S corresponds to a foreground pixel. Further, $S_I$ dictates that if the number of pixels belonging to a particular bin is greater than a threshold, then the pixel be considered background and $S_B$ enforces the condition that a pixel considered background in the past frames is to be considered background in the present frame as well.

At step 106, the segments of each of the plurality of images are refined by setting pixels in the segment of each of the plurality of images to zero if the corresponding image segment differs from mean background by less than μ+σ, where μ is the minimum intensity difference for two pixels to be considered dissimilar.

At step 108, the foreground frame is refined and the background frame is updated. The foreground sample that intersects with more than a predefined parameter $a_1$ samples in the background model is relabelled as background. For example, the value of the predefined parameter $a_1$ may be set to 2 samples. The most recent background frame B is updated using the image segment according to equation 4, $$B=B\odot S+I\odot(1-S) \quad \text{eq.4}$$

where S is foreground and I is image. Initially, the first frame is taken to be a model of the background. Since the variance in the background is initially unreliable, we modify the variance according to equation 5, $$\sigma=\sigma*i/N \quad \text{eq.5}$$

where i is the frame index, N represents the initial set of frames for modelling the background and may be set equal to 200. For the background model, the initial i≤W frames are populated with the most recent background until the background model stack is full. As mentioned earlier, until i=W frames, if a pixel x(i,j) is classified as a background, a random neighbour is picked and its value is updated with the background and stored in the background model stack. For example, W may be set equal to 50, and μ may be set equal to 0.02. After getting an approximate foreground, a median filter may be applied as a post processing operation if necessary. Thereafter, all the foreground blobs having size greater than a predefined threshold are extracted. Blobs are connected components or regions of the image.

At step 110, statistical weights are assigned for size/area of the extracted foreground blobs, intensity, distance, displacement vectors, and dilated edges measures across frames for the extracted one or more blobs. Then, correspondences for the one or more blobs are searched in the current frame by calculating a final weight as a combination of an initial weight and a similarity weight with a predetermined learning rate. The initial weight that is also referred to as dilated edge overlap weight is calculated by initializing one or more blobs in the current frame with weight of the corresponding mapping that have a corresponding blob in the previous frame and with a negative weight to those that have no previous correspondences, wherein the weight depends on the overlap of the blobs with the edges. The initial weight $W_{initial}(p_k(i))$ is calculated for the blobs $p_k(i)$ with the current frame index k as $$W_{initial}(p_k(i)) = \begin{cases} W(\mathfrak{L}(p_k(i)) \to p_k(i)), \text{ if } W(\mathfrak{L}(p_k(i)) \to p_k(i)) > 0 \\ \mathcal{P} * |p_k(i) \cap E^D|, \text{ else} \end{cases}$$

where $\mathcal{P}$ is a penalty parameter, $E^D$ is a set of dilated edge pixels and $\mathfrak{L}(p_k(i))$ is the blob in the previous frame corresponding to $p_k(i)$, i=1, 2, ..., wherein W(x) indicates the weight given to the blob x and W(x→y) denotes the weight of the mapping of blob x to blob y.

In an example embodiment, the statistical weight for size is assigned by calculating the similarity weight also referred as the correspondence weight with respect to size by imposing a penalty on randomly varying blob sizes from frame to frame and calculating the similarity size weight as $$W_{sim}(N^j(p_k(i))) = -1 + 2\ \exp\left(-\beta_j \left|\log\left(\frac{a_2 + a_{next}^j}{a_2 + a}\right)\right|\right),$$

where $a = \text{area}(p_k(i))$ and $$a_{next}^j = \text{area}(N^j(p_k(i))), \beta_j = 1 + \frac{\beta_0\ d_{next}^j}{\sqrt{M^2 + N^2}}$$

indicates a predefined parameter, $\beta_0$ is a positive constant and $d_{next}^j$ is the distance between the current blob and its $j^{th}$ neighbor in the next frame $N^j(p_k(i))$, and $a_2$ is a predefined constant for allowing foreground area size fluctuations to account for small sized objects. In an aspect, when $a_{next}^j$ and $a$ are substantially different from each other then the mapping is penalized with negative weight of '1'. When $a_{next}^j$ and $a$ are substantially similar then the mapping receives positive weight of '1'.

Generally, the intensity of real objects does not change rapidly from one frame to another frame whereas the intensity of dynamic background movement misdetections does not show any particular behaviour. In another example embodiment, the statistical weight for intensity is assigned by calculating the similarity weight with respect to intensity by calculating the similarity intensity weight as $W_{sim}(N^j(p_k(i))) = W_{sim}(N^j(p_k(i))) - 1 + 2\ \exp(-\beta_j{}^g *(c_{next}^j - c)^2)$, where $c = \langle (p_k(i)) \rangle$ is intensity for current blob and $c_{next}^j = \langle (N^j(p_k(i))) \rangle$ denotes intensity for neighboring blob in next frame, $\langle I(N^j(p_k(i))) \rangle$ denotes the average over the blob pixels, and $g$ is a predefined constant chosen in such a way that a 10% difference in intensity results in no penalty. In an aspect, the inter-frame blobs with larger intensity differences are strongly penalized (incorporated squared difference instead of absolute difference) to avoid larger intensity differences across frames.

In an aspect, the speed of real objects cannot change instantaneously. Therefore, it is expected that a real object should cover roughly the same distance between two consecutive pairs of frames. In another example embodiment, the statistical weight for distance is assigned by calculating the similarity weight with respect to distance by capturing the motion of true objects by including a trust parameter t and using it to calculate the similarity distance weight, wherein the trust parameter is $t(p_k(i)) = t_0(1 + t*\aleph(p_k(i)))$, where $t_0$ and $t$ are predefined positive constants and $\aleph(p_k(i))$ denotes the number of previous frames for which $p_k(i)$ has correspondences. The similarity distance weight is calculated as $$W_{sim}(N^j(p_k(i))) =$$

$$W_{sim}(N^j(p_k(i))) + t(p_k(i)) * \left(-1 + 2\ \exp\left(-\beta_j\left|\log\left(\frac{d_1 + d_{next}^j}{d_1 + d}\right)\right|\right)\right)$$

where d denotes the distance traveled by the blob from the previous frame to the current frame and $d_{next}^j$ denotes the distance between the current blob and its $j^{th}$ neighbour in the next frame, and $d_1$ is a predefined constant for allowing distance fluctuations.

Since velocity of real objects cannot change instantaneously, it is expected that the directions of velocity between adjacent frame pairs are correlated. However, slow moving objects that are corrupted by turbulence often show random fluctuations in the velocity and thus defeat the purpose of the velocity measure in identifying real objects. An alternative criterion of displacement from the initial detected location of the blob (i.e., the location where correspondence first began) may be used to overcome this. Over time, this measure remains robust to small fluctuations. In another example embodiment, the statistical weight for displacement vectors is assigned by calculating the similarity weight with respect to displacement vectors by using the cosine of the angle $\theta$ between the displacement vectors $\lambda_k(p_k(i)) - \lambda^{initial}(p_k(i))$ and $\lambda_{k+1}(N(p_k(i))) - \lambda^{initial}(p_k(i))$ as a measure of consistency in velocity, where $\lambda^{initial}(p_k(i))$ denote the coordinates of the blob corresponding to $p_k(i)$ when the correspondences first began, and $\lambda_k(p_k(i))$ denotes the coordinates of the $i^{th}$ blob in the current frame. The similarity displacement weight is calculated as $W_{sim}(N^j(p_k(i))) = W_{sim}(N^j(p_k(i))) + \cos(\theta)$.

In another example embodiment, the statistical weight for dilated edges is assigned by calculating the similarity weight with respect to dilated edges by using a canny edge detector and dilating the resulting edges using a disk of a predefined radius and obtaining $\overline{E^D}$ as the resulting set of non-edge pixels. The similarity weight for dilated edges is calculated as $W_{sim}(N^j(p_k(i))) = W_{sim}(N^j(p_k(i))) + 2|N^j(p_k(i)) \cap \overline{E^D}|^2$.

Figure 3:
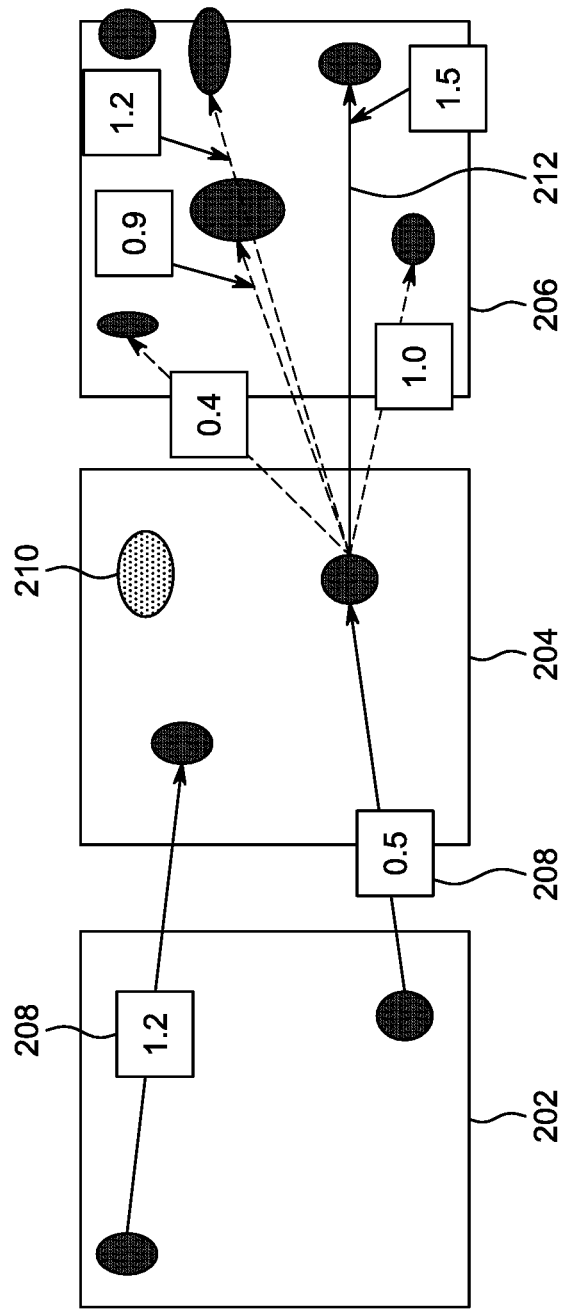
FIG. 3 illustrates an exemplary scenario of assigning weights to foreground blobs for robust tracking of an object.

FIG. 3 illustrates an exemplary scenario of assigning weights to foreground blobs for robust tracking of an object. Previous frame 202 contains two identified objects with respect to which weights 208 are assigned. In current frame 204, a new blob 210 is introduced and an object is further tracked in the next frame 206. The identified object in the current frame 204 may have a plurality of possible matchings in the next frame 206. Individual possible matchings have corresponding weights, while the exact location of the identified object is tracked as having the highest weight 212 in the next frame 206.

Figure 4:
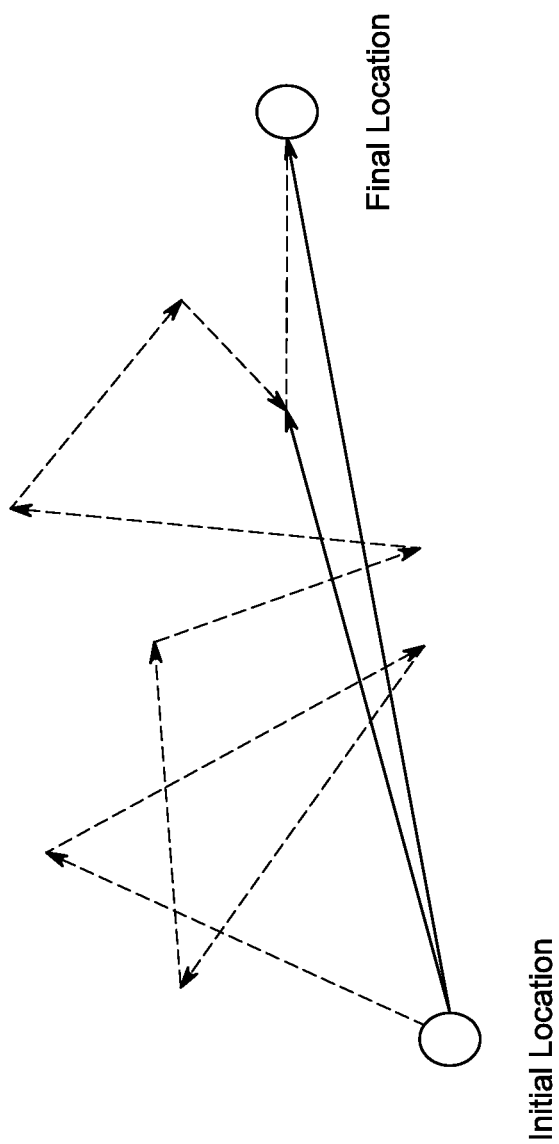
FIG. 4 illustrates sample motion of a slowly moving object of interest, affected by atmospheric turbulence distortions.

Referring to FIG. 4 that illustrates sample motion of a slowly moving object of interest affected by dynamically varying background such as due to atmospheric turbulence in the background. The dotted arrows indicate the velocity vectors of the particle in consecutive frames. The dotted arrows display a high noise component in them. On the other hand, the displacement from the initial locations (black arrows) is well behaved.

At step 112, the potential targets are identified by aggregation of initial weight and similarity weight as estimated earlier. The weight to the map from one or more blobs in the current frame to the one or more potential correspondences in the next frame is calculated according to the equation $$(p_k(i) \to N^j(p_k(i))) =$$

$$\exp\left(\frac{-d_{next}^j}{\sqrt{M^2 + N^2}}\right)[(1-\alpha)W_{initial}(p_k(i)) + \alpha W_{sim}(N^j(p_k(i)))],$$

where $\alpha$ is a predefined constant learning rate and adding an exponential factor for further penalizing the distant blobs.

At step 114, the potential targets are tracked and the bounding box is displayed for one or more true objects, by selecting one or more potential blobs whose weights of the mapping exceeds a predetermined threshold for more than predefined minimum frames continuously. In an aspect, a standard tracking algorithm may be used after detecting one or more true objects in a current frame for updating and predicting undetected objects in one or more next frames. Standard tracking algorithm such as Kalman filtering may be used after detection of potential targets (blob labels as true object) to update and predict undetected objects in future frames.

The flow chart of FIG. 1 shows the method steps for robust tracking of an object. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 1 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

Figure 2:
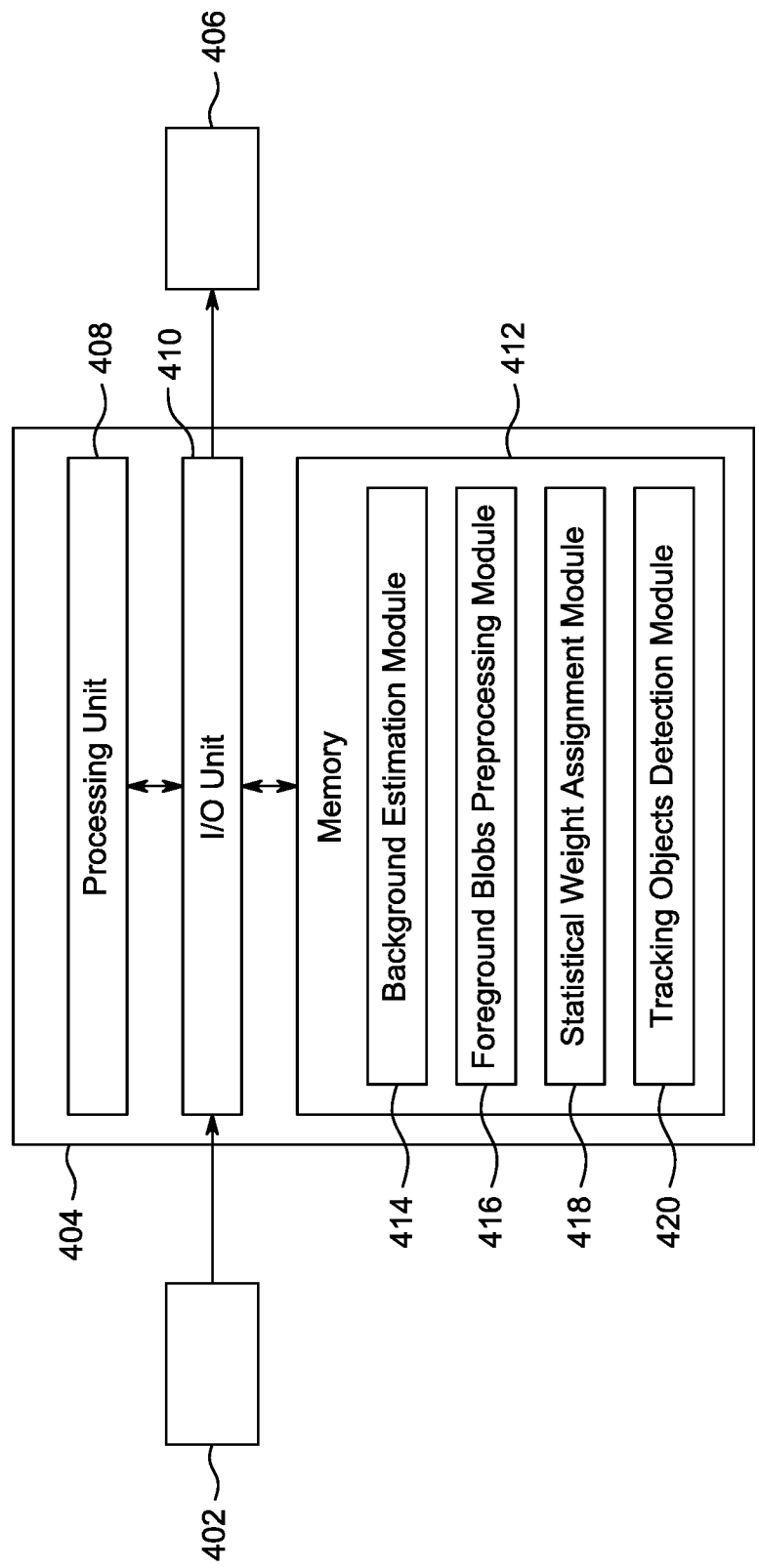
FIG. 2 illustrates a block diagram of a system for robust tracking of an object, according to an example embodiment.

Referring now to FIG. 2, the figure illustrates a block diagram of a system for implementing the disclosed method for robust tracking of an object. The system comprises an image/video capturing device 402, a computation device 404, and an electronic device 406. The image/video capturing device 402, the computation device 404, and the electronic device 406 are communicatively coupled via a communication network that may be a wired or a wireless network. The computation device 404 may comprise a processing unit 408, an input/output (I/O) unit 410, and a memory 412. The memory 412 is configured to store one or more executable instructions that may be executed by the processing unit 408. The one or more executable instructions may be classified into one or more modules, such as a background estimation module 414, a foreground blobs preprocessing module 416, a statistical weight assignment module 418, and a tracking objects detection module 420.

The image/video capturing device 402 may capture a video stream of one or more objects. The captured video stream may comprise a plurality of images and one or more objects present in the plurality of images. Each of the plurality of images may further comprise a foreground image and a background image. The video stream captured by the image/video capturing device 402 may be transmitted to the computation device 404 in real-time via the communication network. In an aspect, the image/video capturing device 402 may be present at a remote location and may store the captured video in a local memory. The stored video may be accessed by the computation device 404 when the communication connection is established between the computation device 404 and the image/video capturing device 402 via the communication network.

The processing unit 408 of the computation device 404 may receive data and one or more commands via the I/O unit 410 to track one or more objects present in the video stream received from the image/video capturing device 402. Based on the received one or more commands, the processing unit 408 may retrieve one or more instructions from the memory 412. The processing unit 408 is configured for executing computer program instructions stored in the memory 412. The processing unit 408 may include one or more general purpose processors (e.g., INTEL microprocessors) and/or one or more special purpose processors (e.g., digital signal processors). The processing unit 408 is configured to execute computer-readable program instructions, such as program instructions to carry out any of the functions described in this description. Memory 412 includes a computer readable medium. A computer readable medium may include volatile and/or non-volatile storage components, such as optical, magnetic, organic or other memory or disc storage, which may be integrated in whole or in part with a processor, such as processing unit 408. Alternatively, the entire computer readable medium may be remote from processing unit 408 and coupled to processing unit 408 by connection mechanism and/or network cable. Memory 412 is enabled to store various types of data and instructions including the background estimation module 414, foreground blobs preprocessing module 416, statistical weight assignment module 418, and tracking objects detection module 420.

The processing unit 408 may extract instructions from the background estimation module 414 and execute such instructions. The background estimation module 414 may determine a foreground image and a background image associated with each image amongst the plurality of images associated with the received video stream. Initially, a background model of size W is determined. Moreover, a histogram of past N image frames and a Histogram of the past N background frames are determined. Based on the histogram of the past N background frames mean and variance of the past N background frames are also determined. An approximate foreground image for each of the plurality of images may be determined by segmenting the plurality of images. In an aspect, the segmentation may be based on a thresholding technique known in the art. Individual image segments and background segments are determined and an element by element product is determined for obtaining the approximate foreground image. The background segment for a pixel location (i,j) is determined based on the equation 1, i.e.

$$S_B(i, j) = \begin{cases} 1, \text{if } |H_B^{ij}(b(x))| < a_1 + \epsilon h_B \\ 0, \text{else} \end{cases}$$

wherein $H_B^{ij}(b(x))$ denotes the bins corresponding to the background intensity at the pixel location (i,j), $h_B = \max_k H_B(k)$ denotes the values of maximum number of occurrences of a bin, and predefined parameter $a_1$ samples in the background model is relabelled as background. For example, the value of the predefined parameter $a_1$ may be set to 2 samples. $\epsilon h_B$ is a parameter added to account for noise and compression artefacts. The image segment for a pixel location (i,j) is determined based on the equation 2, i.e.

$$S_I(i, j) = \begin{cases} 1, \text{if } |H_I^{ij}(b(x))| < c(i, j) h_I^{ij} \\ 0, \text{else} \end{cases}$$

where $H_I^{ij}(b(x))$ denotes the bins corresponding to the original pixel intensity at location (i,j), $h_I=\max_k H_I(k)$ and denotes the values of maximum number of occurrences of a bin and c is the pixel level threshold based on the background variance.

Upon obtaining the background segments and the image segments, these segments for each of the plurality of images are refined by setting pixels in the segment of each of the plurality of images to zero if the corresponding image segment differs from mean background by less than $\mu+\sigma$ where $\mu$ is the minimum intensity difference for two pixels to be considered dissimilar. The image segments that intersect with more than predefined parameter $a_1$ samples in the background model are relabelled as background. For example, the value of the predefined parameter $a_1$ may be set to 2 samples. Then the most recent background frame B is updated using the segmentation decision according to equation 4, i.e.

$$B=B\odot S+I\odot(1-S)$$

where S is foreground and I is the image.

The processing unit 408 may then extract and execute the instructions from foreground blobs processing module 416. The foreground blobs processing module 416 may extract one or more foreground blobs from the image segment. The extraction of the foreground blobs may be based on a comparison of a size of a foreground blob with a predefined size threshold.

The processing unit 408 may then extract and execute the instructions from the statistical weight assignment module 418. The statistical weight assignment module 418 may assign statistical weights for size/area of the extracted foreground blobs based on one or more of the intensity, distance, displacement vectors, and dilated edges of the extracted foreground blobs across a plurality of frames associated with the received video stream. Then, correspondences for the one or more blobs may be searched in the current frame by calculating a final weight as a combination of an initial weight and a similarity weight with a pre-determined learning rate. The various methods for determining and assigning the weights have already been described above with reference to FIG. 1. It is to be specifically noted that the blob analysis technique and the weight updating strategy as provided by the disclosed system and method are based on multiple constraints such as size, area, distance, displacement, intensity, and the like.

The potential targets are then identified from the one or more blobs in the current frame based on assignment of a weight to a map of the one or more blobs in the current frame to one or more correspondence of the one or more blobs in the subsequent frame. In an aspect, the identification comprises selection of a blob with highest cumulative positive weight, from the one or more blobs in the current frame.

The processing unit 408 may then extract and execute the instructions from the tracking objects detection module 420. The tracking objects detection module 420 may identify one or more true objects from the one or more objects present in the frames of the received video stream. The one or more true objects may be identified from the one or more objects by selecting of one or more blobs having weights of the mapping exceeding a predetermined threshold for more than predefined minimum frames continuously. Based on the aforesaid identification of the one or more true objects, the processing unit 408 may generate one or more bounding boxes that correspond to the identified one or more true objects. The processing unit 408 may then instruct the I/O unit 222 to display the generated one or more bounding boxes. In an aspect, the generated one or more bounding boxes associated with the identified one or more true objects may be transmitted to the electronic device 406 for display or further processing and analysis.

According to an example embodiment, a system for detecting one or more moving objects in a video is provided. The video comprises a plurality of images wherein each image has a foreground and a background. The system comprises of a processor and a memory communicatively coupled with the processor. The processor is configured for executing one or more programming modules stored in the non-transient memory. The memory comprises of programming modules such as a background estimation module, a foreground preprocessing module, a statistical weight assignment module, and a tracking objects detection module. The background estimation module upon being executed by the processor may determine an approximate foreground for each image of the video by segmenting each of the plurality of images by determining background segment of each image and determining image segment of each image and computing an element by element product, the background segment is determined based on $$S_B(i,j)=\begin{cases} 1, \text{if } |H_B^{ij}(b(x))|<a_1+\epsilon h_B \\ 0, \text{else} \end{cases}$$

where $H_B^{ij}(b(x))$ denotes the bins corresponding to the background intensity at location (i,j), $h_B=\max_k H_B(k)$ denotes the values of maximum number of occurrences of a bin, and $\epsilon h_B$ is a parameter added to account for noise and compression artefacts. Predefined parameter $a_1$ samples in the background model are relabelled as background. For example, the value of the predefined parameter $a_1$ may be set to 2 samples. The image segment is determined based on $$S_I(i,j)=\begin{cases} 1, \text{if } |H_I^{ij}(b(x))|<c(i,j)h_I^{ij} \\ 0, \text{else} \end{cases}$$

where $H_I^{ij}(b(x))$ denotes the bins corresponding to the original pixel intensity at location (i,j), $h_I=\max_k H_I(k)$ and denotes the values of maximum number of occurrences of a bin and c is the pixel level threshold based on the background variance; refining the segments of each of the plurality of images by setting pixels in the segment of each of the plurality of images to zero if the corresponding image segment differs from mean background by less than $\mu+\sigma$ where $\mu$ is the minimum intensity difference for two pixels to be considered dissimilar; relabeling the foreground samples as background that intersect with more than $a_1$ samples in the background model; and updating the most recent background frame B as $B=B\odot S+I\odot(1-S)$ using the segmentation decision where S is foreground and I is image. The foreground preprocessing module upon being executed by the processor may extract all the foreground blobs having size greater than a predefined threshold. The statistical weight assignment module upon being executed by the processor may identify potential targets by assigning a weight to the map from one or more blobs in the current frame to the one or more potential correspondences in the next frame. In an aspect, identifying potential targets may include selecting the blob with the highest total positive weight as the blob corresponding to the one or more blobs in the current frame. The tracking objects detection module upon being executed by the processor may track one or more potential targets and display the bounding box for one or more true objects by selecting one or more potential blobs whose weights of the mapping exceeds a predetermined threshold for more than predefined minimum frames continuously.

The described method and system adapt well to gradual lighting changes, transitions of objects from one segment to another (i.e., foreground to background or vice-versa) and slowly varying scenes. The edge based blob selection criterion is well adapted to discard majority of false blobs manifested around edges of the image. Moreover, the disclosed method automatically accommodates scenarios where static background object starts moving and moving objects become background by maintaining separate image frame & background histogram sets. Moreover, the disclosed method enables learning background of complex scenes with snow, trees waving, rain, Atmospheric Turbulence, and the like. Hence, complex scenes with multi model distribution can be effectively handled. The disclosed method also enables detection of moving objects independent of size, area and velocity. Foreground area size fluctuations are also allowed in blob analysis to account for small sized objects. Finally, distance correlation over time is used to separate real blobs from false blobs that make the present method more effective over the existing methods.

In an example embodiment, a non-transient computer-readable medium is provided. The non-transient computer-readable medium includes instructions stored thereon which, when read and executed by one or more computers, causes the one or more computers to perform the method comprising the steps of determining an approximate foreground for each image; extracting all the foreground blobs having size greater than a predefined threshold; assigning statistical weights for size/area of the extracted foreground blobs, intensity, distance, displacement vectors, and dilated edges measures across frames for the extracted one or more blobs and searching for correspondences for the one or more blobs in the current frame by calculating a final weight as a combination of an initial weight and a similarity weight with a pre-determined learning rate; identifying potential targets by assigning a weight to the map from one or more blobs in the current frame to the one or more potential correspondences in the next frame, wherein identifying includes selecting the blob with the highest total positive weight as the blob corresponding to the one or more blobs in the current frame; and tracking potential targets and displaying the bounding box for one or more true objects, by selecting one or more potential blobs whose weights of the mapping exceeds a predetermined threshold for more than predefined minimum frames continuously. The approximate foreground for each image is determined by segmenting each of the plurality of images by determining background segment of each image and determining image segment of each image and computing an element by element product, the background segment is determined based on $$S_B(i, j) = \begin{cases} 1, & \text{if } |H_B^{ij}(b(x))| < a_1 + \epsilon h_B \\ 0, & \text{else} \end{cases}$$

where $H_B^{ij}(b(x))$ denotes the bins corresponding to the background intensity at location (i,j), $h_B = \max_k H_B(k)$ denotes the values of maximum number of occurrences of a bin, and $\epsilon h_B$ is a parameter added to account for noise and compression artefacts. Predefined parameter $a_1$ samples in the background model are relabelled as background. For example, the value of the predefined parameter $a_1$ may be set to 2 samples. The image segment is determined based on $$S_I(i, j) = \begin{cases} 1, & \text{if } |H_I^{ij}(b(x))| < c(i, j) h_I^{ij} \\ 0, & \text{else} \end{cases}$$

where $H_I^{ij}(b(x))$ denotes the bins corresponding to the original pixel intensity at location (i,j), $h_I = \max_k H_I(k)$ and denotes the values of maximum number of occurrences of a bin and c is the pixel level threshold based on the background variance; refining the segments of each of the plurality of images by setting pixels in the segment of each of the plurality of images to zero if the corresponding image segment differs from mean background by less than $\mu + \sigma$ where $\mu$ is the minimum intensity difference for two pixels to be considered dissimilar; relabeling the foreground samples as background that intersect with more than $a_1$ samples in the background model; and updating the most recent background frame B as $B = B \odot S + I \odot (1-S)$ using the segmentation decision where S is foreground and I is image.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g. computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for detecting one or more moving objects in a video comprising a plurality of images, each image having a foreground and a background, the method comprising the steps of:

determining an approximate foreground for each image by
determining background segment of each image and determining image segment of each image and computing an element by element product, the background segment is determined based on $$S_B(i,j) = \begin{cases} 1, \text{if } |H_B^{ij}(b(x))| < a_1 + \epsilon h_B^{ij} \\ 0, \text{else} \end{cases}$$

where $H_B^{ij}(b(x))$ denotes the bins corresponding to the background intensity at location (i,j), $h_B = \max_k H_B(k)$ denotes the values of maximum number of occurrences of a bin, $a_1$ is a predefined constant and $\epsilon h_B^{ij}$ is a parameter added to account for noise and compression artefacts, and the image segment is determined based on $$S_I(i,j) = \begin{cases} 1, \text{if } |H_I^{ij}(b(x))| < c(i,j) h_I^{ij} \\ 0, \text{else} \end{cases}$$

where $H_I^{ij}(b(x))$ denotes the bins corresponding to the original pixel intensity at location (i,j), $h_I = \max_k H_I(k)$ and denotes the values of maximum number of occurrences of a bin and $c=0.5(1-2\sigma)$ is the pixel level threshold with $\sigma$ being the standard deviation in the background;

refining the segments of each of the plurality of images by setting pixels in the segment of each of the plurality of images to zero if the corresponding image segment differs from mean background by less than $\mu+\sigma$ where $\mu$ is the minimum intensity difference for two pixels to be considered dissimilar; and relabeling the foreground samples as background that intersect with more than $a_1$ samples in the background model;

updating the most recent background frame B as $B=B\odot S+I\odot(1-S)$ using the segmentation decision where S is foreground and I is image;

extracting all the foreground blobs having size greater than a predefined threshold;

assigning statistical weights for size/area of the extracted foreground blobs, intensity, distance, displacement vectors, and dilated edges measures across frames for the extracted one or more blobs and searching for correspondences for the one or more blobs in the current frame by calculating a final weight as a combination of an initial weight and a similarity weight with a pre-determined learning rate, wherein the assigning of the statistical weights for size by calculating the similarity weight with respect to size comprises:

imposing a penalty on randomly varying blob sizes from frame to frame; and calculating the similarity size weight $W_{sim}$ as an exponential function of several parameters including a, $a_2$, $a_{next}^j$, and $\beta_j$, wherein a denotes area of a frame $p_k(i)$, $a_2$ denotes a predefined constant for allowing foreground area size fluctuations in blob analysis to account for small sized objects, $a_{next}^j$ denotes area of a next frame $N^j(p_k(i))$, and $\beta_j$ denotes a predefined parameter;

identifying potential targets by assigning a weight to the map from one or more blobs in the current frame to the one or more potential correspondences in the next frame, wherein identifying includes selecting the blob with the highest total positive weight as the blob corresponding to the one or more blobs in the current frame; and tracking potential targets and displaying the bounding box for one or more true objects, by selecting one or more potential blobs whose weights of the mapping exceeds a predetermined threshold for more than predefined minimum frames continuously.

2. The method of claim 1, wherein the objects are detected independent of size and velocity.

3. The method of claim 1, wherein the image comprises a dynamic movement in the background.

4. The method of claim 1, wherein the dynamic movement comprises one or more of snow, trees waving, rain, or atmospheric turbulence.

5. The method of claim 1, further comprising using a tracking algorithm after detecting one or more true objects in a current frame for updating and predicting undetected objects in one or more next frames.

6. The method of claim 1, wherein the initial weight is calculated by:

initializing one or more blobs in the current frame with weight of the corresponding mapping that have a corresponding blob in the previous frame and with a negative weight to those that have no previous correspondences, wherein the weight depends on the overlap of the blobs with the edges; and calculating the initial weight $W_{initial}(p_k(i))$ for the blobs $p_k(i)$ with the current frame index k as $$W_{initial}(p_k(i)) = \begin{cases} W(\mathfrak{C}(p_k(i)) \to p_k(i)), \text{if } W(\mathfrak{C}(p_k(i)) \to p_k(i)) > 0 \\ -\mathcal{P} * |p_k(i) \cap E^D|, \text{else} \end{cases}$$

where $\mathcal{P}$ is a penalty parameter, $E^D$ is a set of dilated edge pixels and $\mathfrak{C}(p_k(i))$ is the blob in the previous frame corresponding to $p_k(i)$, i=1, 2, . . . , wherein W(x) indicates the weight given to the blob x and W(x→y) denotes the weight of the mapping of blob x to blob y.

7. The method of claim 1, wherein the similarity size weight $W_{sim}$ is calculated as $$W_{sim}(N^j(p_k(i))) = -1 + 2\exp\left(-\beta_j \left|\log\left(\frac{a_2 + a_{next}^j}{a_2 + a}\right)\right|\right),$$

where $a=\text{area}(p_k(i))$ and $$a_{next}^j = \text{area}(N^j(p_k(i))), \beta_j = 1 + \frac{\beta_0 \, d_{next}^j}{\sqrt{M^2 + N^2}}$$

indicates the predefined parameter, $\beta_0$ is a positive constant and $d_{next}^j$ is the distance between the current blob and its $j^{th}$ neighbor in the next frame $N^j(p_k(i))$.

8. The method of claim 1, wherein the step of assigning statistical weight for intensity by calculating the similarity weight with respect to intensity further comprising the steps of:

calculating the similarity intensity weight as $W_{sim}(N^j(p_k(i)))=W_{sim}(N^j(p_k(i)))-1+2 \exp(-\beta_j^g *(c_{next}^j-c)^2)$, where $c=\langle I(p_k(i))\rangle$ is intensity for current blob and $c_{next}^j = \langle I(N^j(p_k(i))) \rangle$ denotes intensity for neighboring blob in next frame, $\langle I(N^j(p_k(i))) \rangle$ denotes the average over the blob pixels, and $\mathcal{G}$ is a predefined constant.

9. The method of claim 1, wherein the step of assigning statistical weight for distance by calculating the similarity weight with respect to distance further comprising the steps of:
capturing the motion of true objects by including a trust parameter t and using it to calculate the similarity distance weight, wherein the trust parameter is $t(p_k(i)) = t_0(1 + t*\aleph(p_k(i)))$, where $t_0$ and t are predefined positive constants and $\aleph(p_k(i))$ denotes the number of previous frames for which $p_k(i)$ has correspondences; and
calculating the similarity distance weight as $$W_{sim}(N^j(p_k(i))) =$$
$$W_{sim}(N^j(p_k(i))) + \text{or } t(p_k(i)) * \left(-1 + 2 \exp\left(-\beta_j \left|\log\left(\frac{d_1 + d_{next}^j}{d_1 + d}\right)\right|\right)\right),$$

where d denotes the distance traveled by the blob from the previous frame to the current frame and $d_{next}^j$ denotes the distance between the current blob and its $j^{th}$ neighbour in the next frame, and $d_1$ is a predefined constant for allowing distance fluctuations.

10. The method of claim 1, wherein the step of assigning statistical weight for displacement vectors by calculating the similarity weight with respect to displacement vectors further comprising the steps of:
using the cosine of the angle θ between the displacement vectors $\lambda_k(p_k(i)) - \lambda^{initial}(p_k(i))$ and $\lambda_{k+1}(N(p_k(i))) - \lambda_{initial}(p_k(i))$ as a measure of consistency in velocity, where $\lambda^{initial}(p_k(i))$ denote the coordinates of the blob corresponding to $p_k(i)$ when the correspondences first began, and $\lambda_k(p_k(i))$ denotes the coordinates of the $i^{th}$ blob in the current frame; and
calculating the similarity displacement weight as $W_{sim}(N^j(p_k(i))) = W_{sim}(N^j(p_k(i))) + \cos(\theta)$.

11. The method of claim 1, wherein the step of assigning statistical weight for dilated edges by calculating the similarity weight with respect to dilated edges further comprising the steps of:
using a canny edge detector and dilating the resulting edges using a disk of a predefined radius and obtaining $E^D$ as the resulting set of dilated edge pixels; and
calculating the similarity weight for dilated edges as $W_{sim}(N^j(p_k(i))) = W_{sim}(N^j(p_k(i))) + 2|N^j(p_k(i)) \cap \overline{E^D}|^2$.

12. The method of claim 1, wherein the step of identifying potential targets further comprising the steps of:
assigning a weight to the map from one or more blobs in the current frame to the one or more potential correspondences in the next frame, wherein the weight is $$W(p_k(i) \to N^j(p_k(i))) =$$
$$\exp\left(\frac{-d_{next}^j}{\sqrt{M^2 + N^2}}\right)[(1-\alpha)W_{initial}(p_k(i)) + \alpha W_{sim}(N^j(p_k(i)))],$$

where α is a predefined constant learning rate and adding an exponential factor for further penalizing the distant blobs.

13. A system for detecting one or more moving objects in a video comprising a plurality of images, each image having a foreground and a background, comprising:

a processor configured for executing one or more programming modules stored in a non-transient memory, wherein the memory comprises of:
a background estimation module that upon being executed by the processor determines
an approximate foreground for each image by determining background segment of each image and determining image segment of each image and computing an element by element product, the background segment is determined based on $$S_B(i,j) = \begin{cases} 1, \text{if } |H_B^{ij}(b(x))| < a_1 + \epsilon h_B^{ij} \\ 0, \text{else} \end{cases}$$

where $H_B^{ij}(b(x))$ denotes the bins corresponding to the background intensity at location (i,j), $h_B = \max_k H_B(k)$ denotes the values of maximum number of occurrences of a bin, $a_1$ is a predefined constant, and $\epsilon h_B^{ij}$ is a parameter added to account for noise and compression artefacts, and the image segment is determined based on $$S_I(i,j) = \begin{cases} 1, \text{if } |H_I^{ij}(b(x))| < c(i,j) h_I^{ij} \\ 0, \text{else} \end{cases}$$

where $H_I^{ij}(b(x))$ denotes the bins corresponding to the original pixel intensity at location (i,j), $h_I = \max_k H_I(k)$ and denotes the values of maximum number of occurrences of a bin and $c = 0.5(1 - 2\sigma)$ is the pixel level threshold with σ being the standard deviation in the background;
refining the segments of each of the plurality of images by setting pixels in the segment of each of the plurality of images to zero if the corresponding image segment differs from mean background by less than μ+σ where μ is the minimum intensity difference for two pixels to be considered dissimilar;
relabeling the foreground samples as background that intersect with more than $a_1$ samples in the background model; and
updating the most recent background frame B as $B = B \odot S + I \odot (1-S)$ using the segmentation decision where S is foreground and I is image;
a foreground preprocessing module that upon being executed by the processor extracts all the foreground blobs having size greater than a predefined threshold;
a statistical weight assignment module that upon being executed by the processor identifies potential targets by assigning a weight to the map from one or more blobs in the current frame to the one or more potential correspondences in the next frame and by assigning statistical weights for size/area of the extracted foreground blobs, wherein identifying includes selecting the blob with the highest total positive weight as the blob corresponding to the one or more blobs in the current frame, and wherein the assigning of the statistical weights for size by calculating a similarity weight with respect to size comprises:
imposing a penalty on randomly varying blob sizes from frame to frame; and
calculating the similarity size weight $W_{sim}$ as an exponential function of several parameters including a, $a_2$, $a_{next}^j$, and $\beta_j$, wherein a denotes area of a frame $p_k(i)$, $a_2$ denotes a predefined constant for allowing foreground area size fluctuations in blob analysis to account for small sized objects, $a_{next}^j$ denotes area of a next frame $N^j(p_k(i))$, and $\beta_j$ denotes a predefined parameter;

a potential targets identification module that upon being executed by the processor identifying potential targets by assigning a weight to the map from one or more blobs in the current frame to the one or more potential correspondences in the next frame, wherein identifying includes selecting the blob with the highest total positive weight as the blob corresponding to the one or more blobs in the current frame; and a tracking objects detection module that upon being executed by the processor tracks potential targets and displaying the bounding box for one or more true objects, wherein detection of one or more true objects is performed by selecting one or more potential blobs whose weights of the mapping exceeds a predetermined threshold for more than predefined minimum frames continuously.

14. The system of claim 13, wherein the system accounts for small camera jitters.

15. A non-transient computer-readable medium, including instructions stored thereon which, when read and executed by one or more computers, causes the one or more computers to perform the method comprising the steps of:

determining an approximate foreground for each image by determining background segment of each image and determining image segment of each image and computing an element by element product, the background segment is determined based on $$S_B(i, j) = \begin{cases} 1, & \text{if } |H_B^{ij}(b(x))| < a_1 + \epsilon h_B^{ij} \\ 0, & \text{else} \end{cases}$$

where $H_B^{ij}(b(x))$ denotes the bins corresponding to the background intensity at location $(i,j)$, $h_B = \max_k H_B(k)$ denotes the values of maximum number of occurrences of a bin, $a_1$ is a predefined constant, and $\epsilon h_B^{ij}$ is a parameter added to account for noise and compression artefacts, and the image segment is determined based on $$S_I(i, j) = \begin{cases} 1, & \text{if } |H_I^{ij}(b(x))| < c(i, j) h_I^{ij} \\ 0, & \text{else} \end{cases}$$

where $H_I^{ij}(b(x))$ denotes the bins corresponding to the original pixel intensity at location $(i,j)$, $h_I = \max_k H_I(k)$ and denotes the value of maximum number of occurrences of a bin and $c=0.5(1-2\sigma)$ is the pixel level threshold with $\sigma$ being the standard deviation in the background; and refining the segments of each of the plurality of images by setting pixels in the segment of each of the plurality of images to zero if the corresponding image segment differs from mean background by less than $\mu+\sigma$ where $\mu$ is the minimum intensity difference for two pixels to be considered dissimilar;

relabeling the foreground samples as background that intersect with more than $a_1$ samples in the background model; and updating the most recent background frame B as $B=B\odot S+I\odot(1-S)$ using the segmentation decision where S is foreground and I is image;

extracting all the foreground blobs having size greater than a predefined threshold;

assigning statistical weights for size/area of the extracted foreground blobs, intensity, distance, displacement vectors, and dilated edges measures across frames for the extracted one or more blobs and searching for correspondences for the one or more blobs in the current frame by calculating a final weight as a combination of an initial weight and a similarity weight with a pre-determined learning rate, wherein the assigning of the statistical weights for size by calculating a similarity weight with respect to size comprises:

imposing a penalty on randomly varying blob sizes from frame to frame; and calculating the similarity size weight $W_{sim}$ as an exponential function of several parameters including $\alpha$, $a_2$, $a_{next}^j$, and $\beta_j$, wherein $\alpha$ denotes area of a frame $p_k(i)$, $a_2$ denotes a predefined constant for allowing foreground area size fluctuations in blob analysis to account for small sized objects, $a_{next}^j$ denotes area of a next frame $N^j(p_k(i))$, and $\beta_j$ denotes a predefined parameter;

identifying potential targets by assigning a weight to the map from one or more blobs in the current frame to the one or more potential correspondences in the next frame, wherein identifying includes selecting the blob with the highest total positive weight as the blob corresponding to the one or more blobs in the current frame; and tracking potential targets and displaying the bounding box for one or more true objects, by selecting one or more potential blobs whose weights of the mapping exceeds a predetermined threshold for more than predefined minimum frames continuously.

* * * * *